(12) United States Patent
Voonna (10) Patent No.: US 9,830,359 B2
(45) Date of Patent: Nov. 28, 2017

(54) MARKING AND SEARCHING MOBILE CONTENT BY LOCATION

(71) Applicant: Cellco Partnership, Basking Ridge, NJ (US)

(72) Inventor: Thirumalarao Voonna, Somerset, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 353 days.

(21) Appl. No.: 14/144,848

(22) Filed: Dec. 31, 2013

(65) Prior Publication Data

US 2015/0186467 A1 Jul. 2, 2015

(51) Int. Cl.
*G06F 17/30* (2006.01)
(52) U.S. Cl.
CPC .. *G06F 17/30528* (2013.01); *G06F 17/30041* (2013.01); *G06F 17/30997* (2013.01)
(58) Field of Classification Search
CPC ......... G06F 17/30041; G06F 17/30528; G06F 17/30997
USPC ........................................................ 707/706
See application file for complete search history.

(56) References Cited

U.S. PATENT DOCUMENTS

| 9,244,930 | B1* | 1/2016 | Gildfind | G06F 17/3087 |
| 2004/0006726 | A1* | 1/2004 | Adam | H04B 10/071 |
| | | | | 714/57 |
| 2004/0199504 | A1* | 10/2004 | Russell | G06F 17/30876 |
| 2008/0077642 | A1* | 3/2008 | Carbone | G06F 17/30241 |
| | | | | 709/203 |
| 2008/0167009 | A1* | 7/2008 | Novick | H04M 1/7255 |
| | | | | 455/413 |
| 2008/0215552 | A1* | 9/2008 | Safoutin | G06F 3/04847 |
| 2008/0249996 | A1* | 10/2008 | Prahlad | G06F 17/30442 |
| 2008/0319990 | A1* | 12/2008 | Taranenko | G06F 17/30241 |
| 2009/0115862 | A1* | 5/2009 | Andersson | G09B 29/106 |
| | | | | 348/222.1 |
| 2009/0222482 | A1* | 9/2009 | Klassen | G06F 17/30241 |
| 2009/0324211 | A1* | 12/2009 | Strandell | G01S 5/0045 |
| | | | | 396/310 |
| 2010/0318580 | A1* | 12/2010 | Ryu | H04N 5/232 |
| | | | | 707/803 |
| 2011/0009159 | A1* | 1/2011 | Muzina | G01C 21/3676 |
| | | | | 455/550.1 |
| 2011/0079639 | A1* | 4/2011 | Khan | H04N 1/00326 |
| | | | | 235/375 |
| 2011/0161334 | A1* | 6/2011 | Sivakkolundhu | G06F 17/30241 |
| | | | | 707/758 |
| 2011/0225156 | A1* | 9/2011 | Pavlik | G06F 17/30038 |
| | | | | 707/737 |

(Continued)

OTHER PUBLICATIONS

Manual entitled "EarthExplorer Help Documentation" by the United States Geological Survey, dated Sep. 2013.*

(Continued)

*Primary Examiner* — Mahesh Dwivedi (57) ABSTRACT

A mobile station automatically stores location information and, optionally, time stamps as metadata associated with objects created or accessed by the mobile station. The location information indicates the location of the mobile station when the object is created. The objects stored on the mobile station may then be searched based on the stored location information or on a combination of the stored location information and stored timestamp metadata.

20 Claims, 5 Drawing Sheets

(56) References Cited

U.S. PATENT DOCUMENTS

| | | | | |
|---|---|---|---|---|
| 2012/0210227 A1* | 8/2012 | Lin | ............... | G11B 27/034 |
| | | | | 715/723 |
| 2013/0004014 A1* | 1/2013 | Hickman | ......... | G06F 17/30749 |
| | | | | 382/100 |
| 2013/0007028 A1* | 1/2013 | Alkov | ............. | G06F 17/301 |
| | | | | 707/758 |
| 2013/0091156 A1* | 4/2013 | Raiche | ............ | G06F 17/30522 |
| | | | | 707/758 |
| 2013/0097162 A1* | 4/2013 | Corcoran | ......... | G06F 17/30241 |
| | | | | 707/724 |
| 2013/0117253 A1* | 5/2013 | Wang | ............... | G06F 17/30893 |
| | | | | 707/709 |
| 2015/0186532 A1* | 7/2015 | Agarwal | .......... | G06F 17/30867 |
| | | | | 707/722 |
| 2015/0199379 A1* | 7/2015 | Thierer | ............... | G06F 17/301 |
| | | | | 707/724 |

OTHER PUBLICATIONS

Archive Screenshot of the Earth Explorer Search Interface, by the United States Geological Survey, dated Oct. 25, 2012.*

Article entitled "Introducing Google Drive Search: Find and Restore Lost Data in Seconds!", by EMC, dated Nov. 12, 2013.*

* cited by examiner

METADATA SEARCH

COORDINATES  LONG [   ]   LAT [   ] ← 502

ADDRESS  STREET [   ]   CITY [   ]
COUNTRY [   ]   POSTAL CODE [   ] ← 504

OBJECT TYPE

⦿ CONTACT   ⦿ CALENDAR   ⦿ VIDEO
⦿ NOTE      ⦿ IMAGE      ⦿ MUSIC ← 506

[SEARCH] ← 508

MARKING AND SEARCHING MOBILE CONTENT BY LOCATION

BACKGROUND

In recent years, mobile phones have evolved from a convenient way to make telephone calls to an indispensable data appliance. In addition to allowing a user to make calls, mobile stations such as smart phones allow users to play music, take pictures, make and watch videos, schedule appointments, take notes, edit documents and interact with content on a global information network (e.g. the Internet). Mobile stations have become repositories of many types of information relevant to the lives of their users. Currently, information objects such as items in a contacts database, notes, audio files can be searched based on the name of the object, or text items in or associated with the object that were created by the user.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various embodiments disclosed herein relate to automatically storing location information and, optionally, time stamps as metadata associated with objects created or accessed by a mobile station. The location information indicates the location of the mobile station when the object is created. The objects stored on the mobile station may then be searched based on the stored location information.

Figure 1:
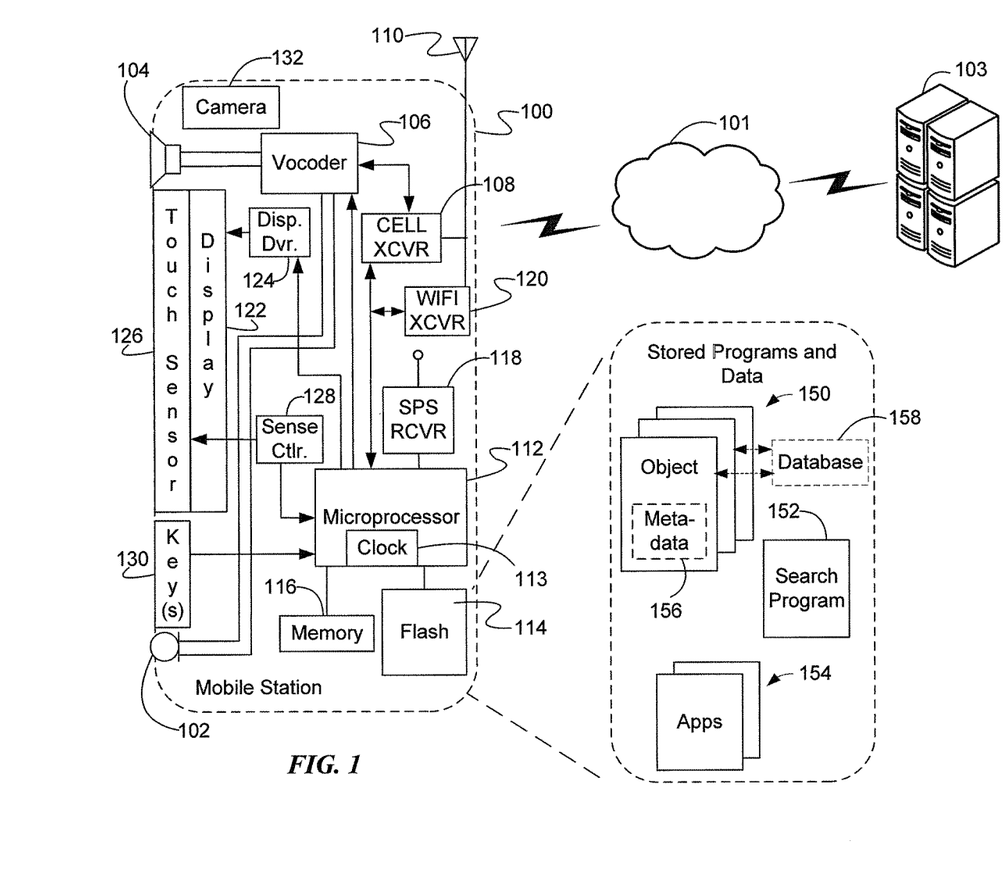
FIG. 1 is a block diagram of a mobile device.

Reference now is made in detail to the examples illustrated in the accompanying drawings and discussed below. FIG. 1 illustrates an example mobile station 100 which may be a smart phone or tablet computer. This implementation of the mobile station includes a microphone 102, a speaker 104 and a voice coder (vocoder) 106, coupled to a cell transceiver 108 and an antenna 110. These elements, under control of a processor 112, implement voice calling functions of the mobile station 100. In one implementation, the processor 112 includes an internal clock circuit 113 that is configured to provide the current time and date as well as to control the sequencing of operations by the processor 112. Although shown as a separate circuit, the clock may be implemented as a function of the processor 112, e.g. in response to timing signals obtained from one or more of the receivers/transceivers of the mobile station 100.

The mobile station also includes a flash memory 114 and memory 116 coupled to the processor 112. The memory 116 may include a random access memory (RAM) and/or read only memory (ROM). In addition, the memory 116 may include secondary storage. For example, memory 116 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or be spread across multiple physical memory devices.

The flash memory includes data storage and program storage for applications that run on the mobile station 100. In one implementation, the flash memory includes storage for objects 150, at least some of which include metadata 156, as well as for applications 154 and a search program 152. Details of one implementation of object processing to store and search the objects by their metadata are provided below with reference to FIGS. 2A-3B. Although not explicitly shown in FIG. 1, the applications 154 stored in the flash memory 114 of the mobile station 100 may include a calendar program, a note-taking application, a contact database and an Internet browser. The applications may also include a mapping program (not shown) that may be used as described below with reference to FIG. 3B.

As an alternative to storing the objects in the flash memory 114, the mobile device 100 may store the objects in a remote server 103 that provides cloud storage for the mobile device. In this implementation, the device 100 sends the objects through the network 101, using either the cellular transceiver 108 or the WiFi transceiver 120. Otherwise, the mobile device 100 may access object data from the remote server 103 in the same way as from the flash memory 114.

The example mobile station 100 also includes a satellite positioning system (SPS) receiver 118 which, in the example, is a global positioning system (GPS) receiver. The SPS system may be a receiver for any satellite positioning system, including the GLONASS, Compass, or Galileo SPS system. The example mobile station 100 also includes a wireless local area network (WLAN) transceiver 120, which in the example is a WiFi transceiver. Alternatively, the WLAN transceiver may be a Bluetooth® transceiver, a Zigbee transceiver, an ultra-wideband (UWB) transceiver, a near-field communications (NFC) transceiver or other wireless network transceiver.

The example mobile station 100 also includes user interface elements, such as a touch-screen display including a display 122 and touch sensor 126; a display driver 124, coupled to the display 122 and the processor 112; and a sense controller 128 coupled to the touch sensor 126 and the processor 112. This user interface also includes keys 130 such as a power button, volume control buttons and a select button (not separately shown). The example thus represents a touchscreen type smart phone or tablet computer, although the object storage and searching functions may be implemented on other types of mobile stations, e.g. having elements providing other types of user interfaces.

Finally, the example mobile station 100 includes a camera 132 that is coupled to the processor 112 (connection not shown) so that image and video objects captured by the camera may be stored in the flash memory 114.

At a high level, at least some applications 154 will execute on the microprocessor 112 in such a way as to configure the mobile station 100 to facilitate creation of data objects 150 via the user interface, via the camera, and/or via network communication through cellular transceiver 108 or cellular transceiver 120. When a data object 150 is created and stored into memory 114, the mobile station will automatically determine its current location when the object was created and include that information identifying that location in the metadata 156 stored for the particular object.

Execution of the search program 152 on the microprocessor 112 enables the user to input at least one search criterion via the user interface and then causes the microprocessor 112 to search the memory 114 for one or more of the objects 150 that meet the search criterion. As discussed in more detailed below, the program 152 allows the user to select a location as a search criterion, and the resulting search operation searches the stored objects 150 for any objects created at a location that satisfies the creation location search criterion. The search program is shown separate from the applications 154 for convenience, although the search related programming may be separate from or embedded within one or more of the applications 154.

It may be helpful now to discuss examples of object creation and searching in somewhat more detail. In the examples, information outputs to the user such as prompts and search results are presented via the display and the user inputs information such as search criteria via the touchscreen sensor(s). Of course other types of inputs and outputs may be used, such as speech responsive inputs alone or in combination with audible outputs.

In one implementation, the user of the device controls whether location metadata is stored with created objects as a device setting or as a setting for the program used to create the object. In this implementation, the device settings application displays a logical on-off switch allows the user to specify whether location metadata is to be automatically collected and saved with the created object. The device settings menu may also include a radio-button or other selection method that allows a user to specify whether the application used to create the object automatically obtains and stores the location metadata or prompts the user for permission to obtain and store the location metadata. Each application program on the mobile device that creates such objects may include settings in the device settings menu that allow a user to specify permissions to obtain and store location metadata. Alternatively, the mobile device may include a menu item for the location metadata that displays logical switches for each application program capable of creating objects, allowing a user to specify which of these applications automatically obtains and stores metadata or does so only after a prompt. This menu may also allow a user to selectively turn-off metadata collection for each selected application program or for all of the application programs. The configuration data for the search program may also allow a user to specify a geographical area around a specified location that is to be searched, in addition to the specified location, for matching location metadata. In addition, the configuration settings may allow a user to indicate whether object data is to be stored in a local memory (e.g. flash memory 114) or in remote cloud storage 103.

Figure 2A:
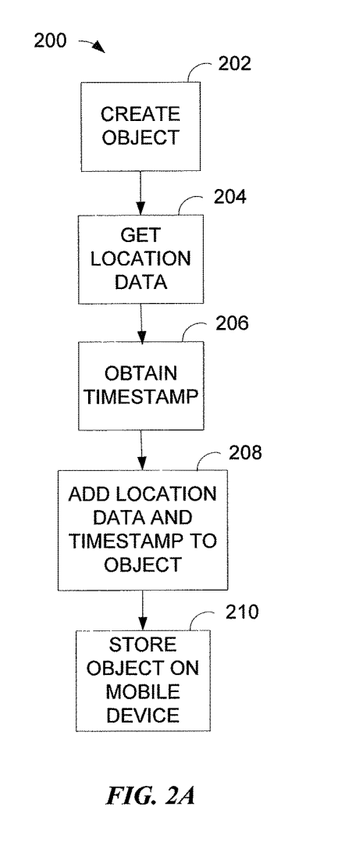
FIGS. 2A, 2B, 3A and 3B are flowchart diagrams that are useful for describing the operation of the mobile device shown in FIG. 1.

FIG. 2A is a flow-chart diagram of a process 200 that may be used to store objects 150 with location metadata 156 in memory 114 of the mobile station 100. The process 200 begins with the creation of the object (202). Objects 150 used in the examples described below, may be any data object created by the user of the mobile station 100. These may include, for example, a contact entry, including the name, address, telephone number and/or email address of a person whom the user has met. An object 150 may also include a calendar entry, scheduling a follow-up appointment with the person, an audio file including the pronunciation of the person's name, captured using the microphone 102, an image or video file of the person captured using the camera 132 or a text file including notes taken by the user concerning the person. All of these objects may be created by the user utilizing the touch sensor 126 and/or other user activated inputs.

After the object 150 is created, the processor 112 stores the object into the flash memory 114. Before the processor 112 stores the object 150, the processor 112 automatically associates metadata with the object or prompts the user for permission to associate the metadata with the object, depending on the device setting. In one implementation, this metadata includes the current location at or about the time when the object was created and a timestamp. The processor 112 first obtains the current location data (204). Example methods for obtaining the location data are described below with reference to FIG. 2B. Next, the processor 112 generates the timestamp using the clock circuit 113 (206), although steps 204 and 206 may occur in opposite order. The processor then associates the creation location data and the timestamp with the object (208), in the form of metadata for the object in our example; and the processor 112 stores the object 150 with the metadata in the flash memory 114 (210).

The association may entail storing the metadata 156 in the same file as the object 150. Alternatively, the metadata may be stored in an optional separate database 158 where each database record includes the metadata and a pointer to the address of the corresponding object 150 in the flash memory 114. In the implementation using the database, the object 150 may also include a pointer in the database 158 to the stored metadata so that, when an object is deleted from the flash memory 114, its corresponding metadata may also be deleted from the database 158.

Figure 2B:
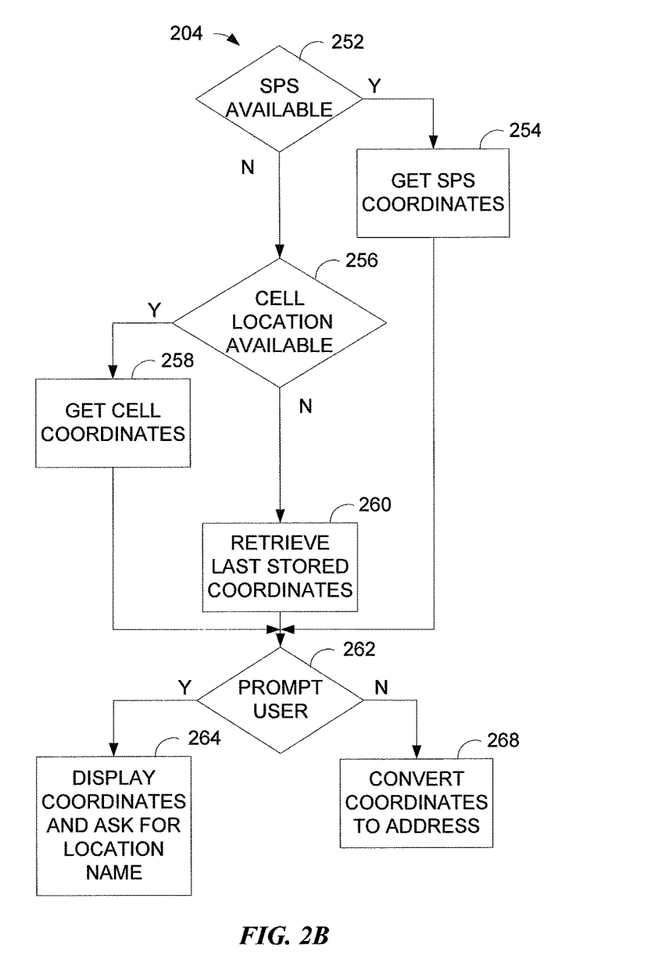

FIG. 2B is a flow-chart diagram of the process 204 that obtains location data. This process first determines if data is available that identifies the location of the mobile station 100 from the SPS receiver 118 (252). The location data may not be available for a number of reasons, including that the SPS receiver has been disabled by the user or that the SPS receiver cannot capture signals from a sufficient number of satellites to determine its position. If the SPS location is available, the process 204 obtains the coordinates (254), typically a latitude and longitude, or X,Y,Z coordinates from the SPS receiver 118.

If the SPS location is not available (252), the process 204 determines whether the mobile station 100 can determine its location based on signals sensed by the cellular transceiver 108. This location data may be the location of the cellular base station with which the mobile station 100 is communicating. Alternatively, if the cellular transceiver senses multiple base stations, it may determine its position based on the relative signal strengths (e.g. received signal strength indication (RSSI)) of the base stations using trilateration. Depending on the cellular network, the position determination may involve some communications with and assistance from the cellular network. If the cell location is available (256) the process 204 obtains the coordinates (258). These may be either the coordinates of the base station with which the mobile station 100 is communicating or the coordinates determined using trilateration. Although not shown in the example, location may also be determined via WiFi, e.g. by obtaining an identifier of a WiFi access point and querying a database through a network to obtain information indicating the location of that access point based on the identifier.

Returning to the example, at step 256, if neither the SPS location nor the cell location is available, (256) the process 204 determines its current location as the last location that was obtained using either the SPS receiver 118 or the signals sensed by the cellular receiver 108. As each new current location is determined, it is stored by the processor 112 in the flash memory 114, overwriting the previously stored location. This stored location is used by the process 204 when the current location cannot be determined using either the SPS receiver 118 or the cellular transceiver 108.

The locations provided by the techniques described above are coordinates, typically latitude and longitude or X,Y,Z coordinates. The user may prefer to have a place name or an address as the location instead of the coordinates, to aid in later object searches. After the process 204 determines the coordinates of the mobile station 100 either as SPS coordinates (254), cellular coordinates (258) or last stored coordinates (260), it determines whether to prompt the user for a location name (262). In one implementation, the user may provide a preference in the device settings for the mobile station 100 or in the user settings for the application used to create and store the object. This preference indicates if the location is to be automatically translated into an address or if the mobile station 100 should prompt the user for an address name. If the preference is for a user prompt, the process prompts the user (264) to enter a location name. The process may display the coordinates determined by the process as a part of the prompt. If the preference is to automatically obtain an address, the process may request an address corresponding to the coordinates from a geographic information system (GIS) database, as described below with reference to FIG. 4.

Figure 3A:
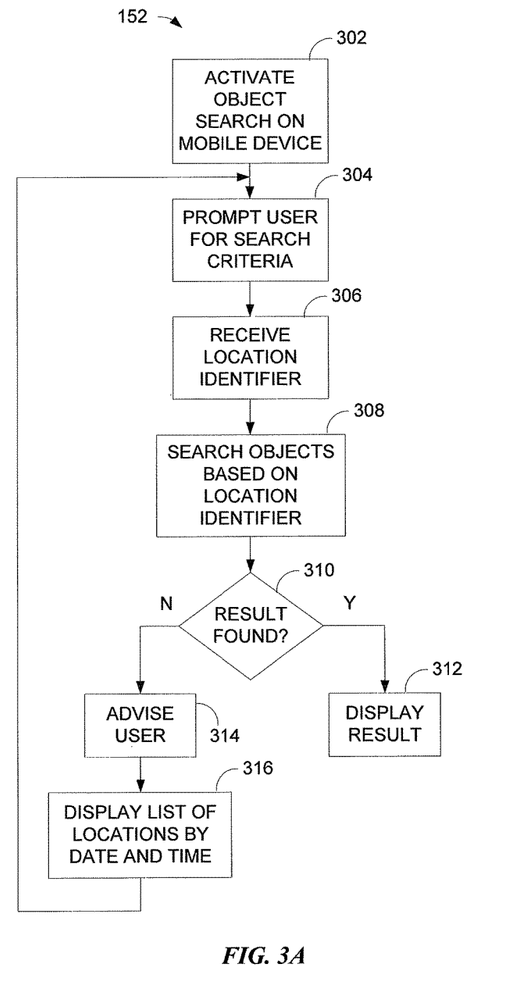

FIG. 3A is a flow-chart diagram of an example object search program 152 (shown in FIG. 1). The example search program is used to retrieve objects stored in the flash memory 114 based on the creation location metadata stored with the object. For example, if a user cannot remember the name of a contact that she met at a conference she attended in Chicago, she may search the contacts objects with "Chicago" as a partial address. The example search program 152 then searches the location metadata of the contacts objects stored in the flash memory 114 for entries having metadata for location of creation corresponding to the entered search data, e.g. for contacts created in Chicago in the example.

Figure 5A:
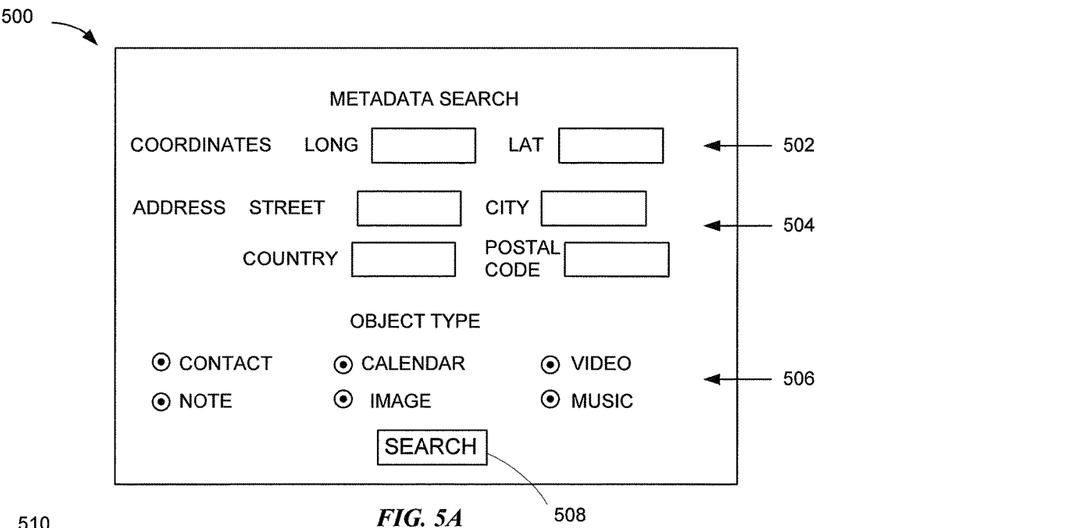
FIGS. 5A and 5B are user drawings of user interfaces that are useful for describing the operation of the system

In one implementation, the user may be presented with the form shown in FIG. 5A including fields 502 for coordinates in degrees, minutes and seconds or in SPS (X, Y, Z) coordinates. The form may also include standard address fields 504 such as street number, street name, city, state, ZIP or other postal code and country. The form may also include buttons 506 that allow the user to specify an object type, for example, a contact, note, calendar entry, image or video file. It is contemplated that the buttons 506 may be radio buttons, such that only one can be selected or selection buttons so that multiple items may be selected by activating multiple buttons. A user may enter partial data, for example only the degrees of latitude and/or longitude or only the city and/or country names. When the data is entered, the user presses the SEARCH button 508. The search program may then return one or more objects having metadata coordinate or address elements that match or are close to matching the provided data. If an object type is entered, only objects of that type are returned. If no object type is entered, all objects satisfying the search criteria are returned, regardless of their type. If no data is entered in the form, the search program may use the current location of the mobile device, as determined by the SPS receiver 118, and display objects having metadata that most closely matches the current location. As described above, this data may be displayed for locations surrounding the current location by a predetermined distance.

Alternatively, the user may look for items with metadata that matches an existing object. For example, the user may remember that a contact she is searching for was created at the same location as another contact, Joan Smith. The metadata search form may include a field (not shown) that allows the user to enter an existing contact name. Pressing the SEARCH button 508 when only the contact is specified, causes the search program 152 to display all objects of the specified type that were created at the same location as the specified contact or within the specified search range of the location of the specified contact.

In this implementation, the search program 152 is activated (302) by the user touching a location on the touch sensor 126 corresponding to a search icon displayed on the display 122. The program then prompts the user for search criteria (304). In the example search program shown in FIG. 3A, these criteria may include approximate coordinates, a place name and/or a partial address as a location identifier. The program receives the location identifier (306) and searches the metadata of the stored objects (308).

If the metadata is stored with the objects, the search program may sequentially retrieve each object and compare the provided location data to the location metadata associated with the object. If the metadata is stored in the database 158, the search program may search the data records of the database or an index of the records, if such an index exists for the partial data provided by the user. In one implementation, the search program 154 does not need an exact match but returns the items that most closely match the provided data. If, for example, the provided partial data is the degrees of latitude and longitude, and there is no exact match, the search program may use a fuzzy search algorithm that expands the search criteria and return all objects having latitude and longitude values within ±N degrees of the provided values. Alternatively, the search algorithm may return the closest matching item(s) without any range limitations. For example, if a user entered "Chicago" and the database 158 did not include any matching entries but did include entries for Curacao Venezuela and Milwaukee Wis., both of those entries may be returned, because "Curacao" is lexically close to "Chicago" and Milwaukee is geographically close to Chicago. As described below with reference to FIG. 4, the search program 154 may use a GIS server to determine which locations are geographically proximate to a referenced location, to determine locations geographically proximate to the current location of the mobile station or to determine locations that are lexically close to the referenced location.

If multiple objects are found with varying degrees of matching, the presentation of the search results may be ordered based on how close the objects match, e.g. closest match first. For example, lexical matches that differ by only one letter are displayed before lexical matches differing by two letters. Also, objects closer to the specified location are displayed before more distant objects. If a large number of objects are found, the search may return a set number of those with the closest match (e.g. the top ten) and/or may only present those having a degree of matching that is the same as or better than a threshold value. For example, a lexical match may be limited to having only one or two non-matching letters and a geographic match may be limited to a predetermined distance.

If the search finds metadata of a sufficient degree of matching in the data stored on the flash memory 214, location metadata found in the search is displayed (312). If no matching metadata is found the program advises the user (314) and then displays all of the locations metadata stored in the flash memory 214 or location metadata stored in a date range, for example, the last six-months, a list (316). These locations are displayed in the order that their corresponding objects were stored. Rather than displaying the location for each object, a single location may be displayed for multiple objects that were created at that location. In each case, some other data about each object identified by the search may also be displayed with the location metadata, e.g. object type, file name, contact name, date of photograph, etc. After displaying the locations, the program branches back to step 304 so that the user can enter data from the list in the search criteria.

Figure 3B:
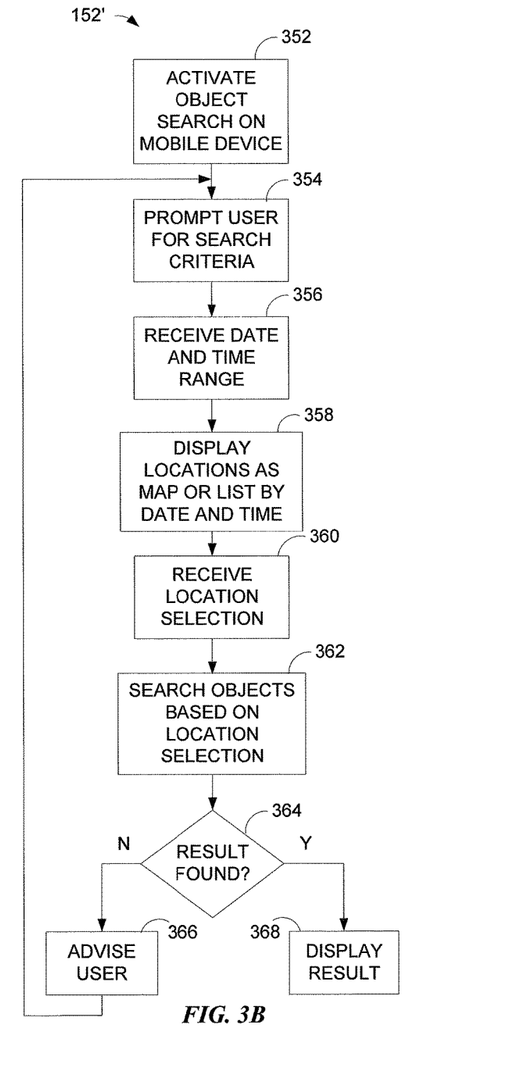

FIG. 3B is a flow-chart diagram of an alternative search program 154'. The program begins at step 352 when it is activated, as described above with reference to step 302 of FIG. 3A. After activation, the program prompts the user for search criteria. In this embodiment, the prompt includes fields for a date and/or time range. The date and time range fields (not shown) may, for example include fields for start and end dates, each including space for a day, a month and a year. In addition, the fields may include start and end times. As with the embodiment described above with reference to FIG. 3A, partial data may be entered in these fields. For example, the user may only input "May" in one of the date fields.

As with the embodiment described above with reference to FIG. 3A, the search criteria may also limit the search to a particular type of object. If no object type is specified, the search program may return matching results for all object types.

The program receives the time and date range (356) and then prompts the user to select a location from a list of the locations stored in the metadata or from a map in which each of the locations in the stored metadata is highlighted (358). The map may be obtained by the search program 154 from a GIS server, as described below or a separate mapping application (not shown) that interfaces with the GIS server to display a map. When a map is used to display the stored locations, the respective sets of coordinates for the locations are stored in the flash memory 214. These coordinates may be provided to the GIS server by the program 154 which may analyze the list of coordinates to determine which map to use and mark the map (e.g. with dots, stars, squares, diamonds or other shapes) at locations corresponding to each of the coordinate sets. The map is then returned to the mobile station 100 for display on the display screen 122. Markers having different shapes may indicate the type of object and the size of the marker may indicate the number of objects having the same location metadata.

Figure 5B:
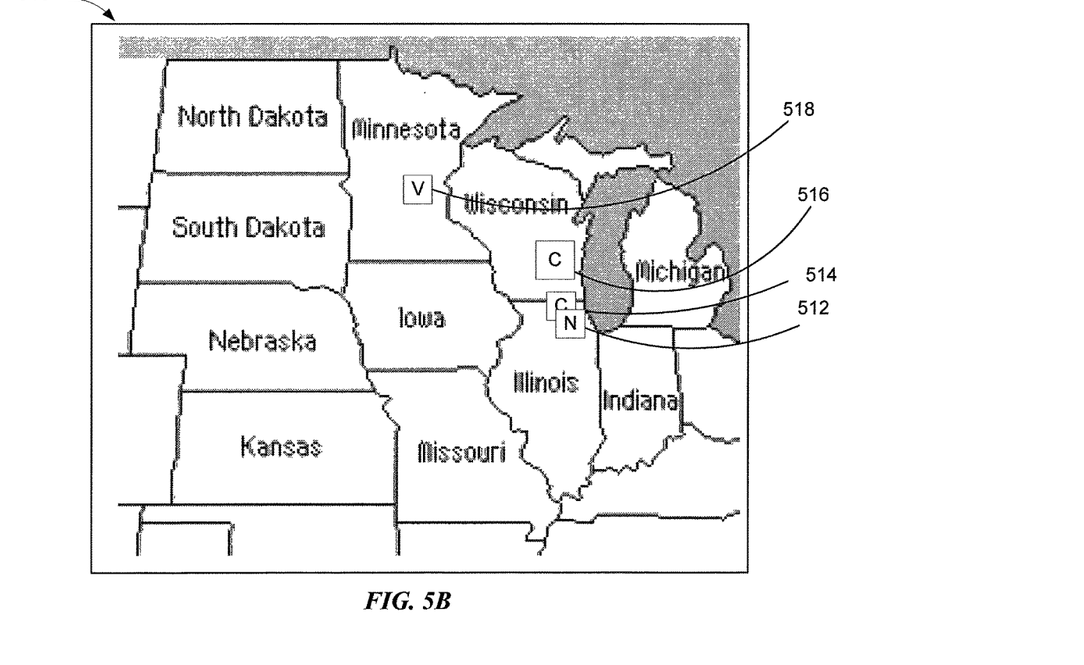

An example map display is shown in FIG. 5B. This map includes markers 512, 514, 516 and 518, in this instance, letters in blocks, that indicate objects having location metadata corresponding to the location of the markers. The letters may indicate the type of object and the size of the blocks may indicate the number of objects of the type having metadata matching the location. The display in FIG. 5B, for example, indicates that the user created one or more notes (512) and contacts (514) in Chicago, multiple contacts (516) in Milwaukee and one or more video files (518) in Minneapolis. As shown in FIG. 5B, when more than one object type has the same location data, the markers may be displaced from one another.

The displayed map may be a relatively global map showing at least enough area so as to encompass all locations identified by location metadata or a smaller area map, such as a national map, a state/province map or a map of an area with a determined radius. In the smaller area map examples, the nation, state, province or center of the radially defined area may be selected based on the location of the mobile station at the time of the search or a location of the mobile station detected during the time window the user selected for the search. The search application may also offer one or more options for the user to select a particular map view (for a current search or as a default setting) and/or to navigate between map views (e.g. by scrolling, zooming, etc.).

The user selects a location by touching the screen at a map location proximate to the particular location in the list or to the displayed marker corresponding to a particular location on the map. After receiving this selection (360), the program 154 searches the objects stored in the flash memory 214 for metadata matching the received time range and location selections (362). If one or more results are found (364) they are displayed to the user (368). If no results are found, the user is notified (366) via a display on the display screen 126, and the program branches to 354 in which the user is prompted to enter other search criteria.

Although the prompts for location and the date and time are shown as separate screens, it is contemplated that they may occur on a single screen. In addition, although the prompt for the location is described in FIG. 3B as using a list or map showing previous locations, it is contemplated that the program 154 may provide the user with a form, as described with reference to steps 304-306 of FIG. 3A.

Figure 4:
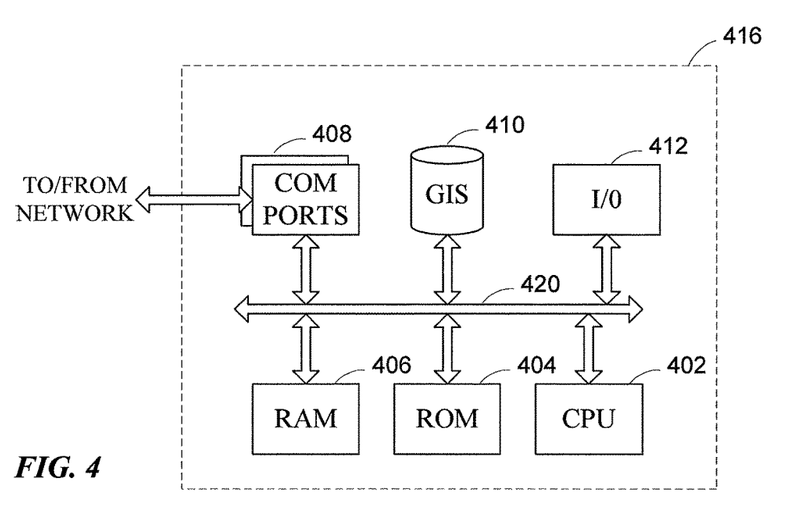
FIG. 4 is a block diagram of a Geographic Information Systems (GIS) server suitable for use with the mobile device shown in FIG. 1.

As described with reference to FIGS. 3A and 3B, the example mobile station 100 interfaces with a GIS server or with another application that interfaces with the GIS server to translate the coordinate data provided by the SPS receiver 118 or the cellular location data determined using the cellular transceiver 108 into an address and/or a location on a map. FIG. 4 is a block diagram of an example GIS server 416.

The GIS server may include communication ports 408 that interface with a network (not shown), for example a WiFi network, a 3G or 4G network or a wired network. The network may be a global information network, such as the Internet, or it may be a wireless local area network or a wireless wide area network. Thus, the communication ports 408, shown in FIG. 4 may be coupled to a cable modem, a WiFi transceiver or a wired or optical cable Ethernet connection, none of which are shown in FIG. 4.

The GIS server 416 also includes a central processing unit (CPU) 402, memory including a read-only-memory (ROM) 404, a random access memory (RAM) (406) a GIS database 410 and an input/output (I/O) module 412. The CPU 402, ROM 404, RAM 406, communication ports 408, GIS database 410 and I/O module 412 communicate with each other via bus 420 connecting all of the elements of the GIS server 416. The ROM 404 of the server 416 holds the program code that is used to access the GIS database. The program code presents an Application Program Interface (API) via the network that allows the search program 154 running on the mobile station 100 to access the GIS database. The software running on the GIS server 416 may be Google Maps, OpenLayers or other software that provides access to GIS data via an API.

As described herein, device 100, shown in FIG. 1, may perform certain operations in response to microprocessor 112 executing software instructions contained in a computer-readable medium, such as memory 116. The software instructions may be read into memory 116 from another computer-readable medium or from another device via the WiFi transceiver 120, cell transceiver 108 or by another communications interface such as a docking port (not shown in FIG. 1). The software instructions contained in memory 116 may cause microprocessor 112 to perform one or more processes described herein. Alternatively, hardwired circuitry may be used in place of, or in combination with, software instructions to implement processes described herein. Thus, implementations described herein are not limited to any specific combination of hardware circuitry and software.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   creating an object on a mobile station;
   determining coordinates indicating a location of the mobile station when the object is created;
   prompting a user of the mobile station to enter a name of the location corresponding to the coordinates;
   receiving, from the user of the mobile station, the name of the location;
   associating the coordinates and the name of the location with the object as metadata;
   writing the object and the metadata into a memory of the mobile station, wherein the memory stores a plurality of objects and metadata corresponding to each of the plurality of objects;
   providing, to a user and via the mobile station, an interface for searching for at least one object in the memory, wherein the interface includes:
      coordinate fields and address fields for entering search location data corresponding to a particular location of the mobile station when the at least one object was created,
      a contact field to indicate that contact entries are to be searched in the memory,
      a calendar field to indicate that calendar entries are to be searched in the memory,
      a note field to indicate that note entries are to be searched in the memory,
      an image field to indicate that images are to be searched in the memory,
      a video field to indicate that videos are to be searched in the memory, and
      a field for entering an object name associated with an object that was created at a same location as the at least one object;
   prompting the user to enter the search location data or the object name via the interface;
   determining whether the user has entered the search location data or the object name;
   searching the metadata stored in the memory of the mobile station based on the search location data or the same location associated with the object name when the user has entered the search location data or the object name,
   wherein searching the metadata based on the search location data or the same location associated with the object name includes:
      searching the memory of the mobile station for metadata that matches the search location data or a geographical area surrounding the search location data, or
      searching the memory of the mobile station for metadata that matches the same location associated with the object name or the geographical area surrounding the same location associated with the object name, wherein the geographical area is previously specified by the user;

searching the metadata stored in the memory of the mobile station based on a current location of the mobile station when the user has not entered the search location data or the object name;

identifying particular metadata that matches the search location data, the same location associated with object name, or the current location of the mobile station; and presenting the at least one object associated with the particular metadata on a display of the mobile station.

2. The method of claim 1, wherein determining the coordinates indicating the location includes:

obtaining the coordinates indicating the location of the mobile station from a satellite positioning system receiver of the mobile station; and translating the coordinates into an address; and wherein associating the coordinates and the name of the location with the object further includes:

associating the address, as the metadata, with the object.

3. The method of claim 1, wherein writing the object and the metadata into the memory includes storing the metadata with the object in the memory.

4. The method of claim 1, wherein writing the object and the metadata into the memory includes:

writing the metadata and a pointer to the object into a database in the memory.

5. The method of claim 1, further comprising:

identifying location metadata associated with the plurality of objects stored in the memory;

obtaining a map spanning all locations corresponding to the identified location metadata; and displaying the map with markers corresponding to the identified location metadata.

6. The method of claim 1, wherein searching the metadata includes searching the metadata for location metadata representing locations geographically proximate to the search location data if no metadata matching the search location data is found.

7. The method of claim 1, wherein:

the search location data includes a place name; and searching the metadata includes searching the metadata for location metadata having place names lexically similar to the place name of the search location data.

8. The method of claim 1, further comprising:

determining a timestamp indicating when the object was created;

associating the timestamp with the object as timestamp metadata; and storing the timestamp metadata in the memory; and wherein searching the metadata includes:

prompting the user to enter timestamp data; and searching the metadata stored in the memory for location data corresponding to the search location data that was stored in the memory at a time corresponding to the entered timestamp data.

9. The method of claim 1, wherein the interface further includes a bookmark field to indicate that bookmark entries are to be searched in the memory.

10. A non-transitory computer readable medium including computer programming instructions, wherein the computer programming instructions, when executed by a processor, cause the processor to:

create an object on a mobile station;

determine coordinates indicating a location of the mobile station when the object is created;

prompt a user of the mobile station to enter a name of the location corresponding to the coordinates;

receive, from the user, the name of the location;

associate the coordinates and the name of the location with the object as metadata;

write the object and the metadata into a memory of the mobile station, wherein the memory stores a plurality of objects and metadata corresponding to each of the plurality of objects;

provide, via the mobile station, an interface for searching for at least one object in the memory, wherein the interface includes:

at least one coordinate field and at least one address field for entering search location data corresponding to a particular location of the mobile station when the at least one object was created, a contact field to indicate that contact entries are to be searched in the memory, a calendar field to indicate that calendar entries are to be searched in the memory, a note field to indicate that note entries are to be searched in the memory, an image field to indicate that images are to be searched in the memory, a video field to indicate that videos are to be searched in the memory, and a field for entering an object name associated with an object that was created at a same location as the at least one object;

prompt the user to enter the search location data or the object name;

determine whether the user has entered the search location data or the object name;

search the metadata stored in the memory of the mobile station based on the search location data or the same location associated with the object name when the user has entered the search location data or the object name, wherein the computer programming instructions that cause the processor to search the metadata based on the search location data or the same location associated with the object name further include computer programming instructions that cause the processor to:

search the memory of the mobile station for metadata that matches the search location data or a geographical area surrounding the search location data, or search the memory of the mobile station for metadata that matches the same location associated with the object name or the geographical area surrounding the same location associated with the object name, wherein the geographical area is previously specified by the user;

search the metadata stored in the memory of the mobile station based on a current location of the mobile station when the user has not entered the search location data or the object name;

identify particular metadata that matches the search location data, the same location associated with object name, or the current location of the mobile station; and present the at least one object associated with the particular metadata on a display of the mobile station.

11. The computer readable medium of claim 10, further comprising computer program instructions that cause the processor to:

obtain the coordinates indicating the location of the mobile station from a satellite positioning system receiver of the mobile station;
translate the coordinates into an address; and
associate the address, as the metadata, with the object.

12. The computer readable medium of claim 10, wherein the computer program instructions that cause the processor to write the object and the metadata into the memory include computer program instructions that cause the processor to:
write the metadata and a pointer to the object into a database in the memory.

13. The computer readable medium of claim 10, further comprising computer program instructions that cause the processor to:
identify location metadata associated with the plurality of objects stored in the memory;
obtain a map spanning all locations corresponding to the identified location metadata; and
display the map with markers corresponding to the identified location metadata.

14. The computer readable medium of claim 10, wherein the computer program instructions that cause the processor to search the metadata stored in the memory include instructions that cause the processor to search the metadata for location metadata representing locations geographically proximate to the search location data if no metadata matching the search location data is found.

15. The computer readable medium of claim 10, wherein the search location data includes a place name; and
wherein the computer programming instructions that cause the processor to search the metadata stored in the memory includes computer programming instructions that cause the processor to search the metadata for location metadata having place names lexically similar to the place name of the search location data.

16. The computer readable medium of claim 10, further comprising computer programming instructions that cause the processor to:
determine a timestamp indicating when the object was created;
associate the timestamp with the created object as timestamp metadata; and
store the timestamp metadata in the memory; and
wherein the computer programming instructions that cause the processor to search the metadata stored in the memory include computer programming instructions that cause the processor to:
prompt the user to enter timestamp data; and
search the metadata stored in the memory for location data corresponding to the search location data that was stored in the memory at a time corresponding to the entered timestamp data.

17. The computer readable medium of claim 10, wherein the interface further includes a bookmark field to indicate that bookmark entries are to be searched in the memory.

18. A mobile device comprising:
a display
a memory; and
a processor, coupled to the memory and the display, the processor configured to:
create an object;
determine coordinates indicating a location of the mobile device when the object is created;
prompt a user of the mobile device to enter a name of the location corresponding to the coordinates;
receive, from the user, the name of the location;
associate the coordinates and the name of the location with the object as metadata;
write the object and the metadata into the memory;
provide an interface for searching for at least one object in the memory, wherein the interface includes:
at least one coordinate field and at least one address field for entering search location data corresponding to a particular location of the mobile device when the at least one object was created,
a contact field to indicate that contact entries are to be searched in the memory,
a calendar field to indicate that calendar entries are to be searched in the memory,
a note field to indicate that note entries are to be searched in the memory,
an image field to indicate that images are to be searched in the memory,
a video field to indicate that videos are to be searched in the memory, and
a field for entering an object name associated with an object that was created at a same location as the at least one object;
prompt the user to enter the search location data or the object name;
determine whether the user has entered the search location data or the object name;
search the metadata stored in the memory of the mobile device based on the search location data or the same location associated with the object name when the user has entered the search location data or the object name,
wherein, when searching the metadata based on the search location data or the same location associated with the object name, the processor is configured to:
search the memory of the mobile device for metadata that matches the search location data or a geographical area surrounding the search location data, or
search the memory of the mobile device for metadata that matches the same location associated with the object name or the geographical area surrounding the same location associated with the object name,
wherein the geographical area is previously specified by the user;
search the metadata stored in the memory of the mobile device based on a current location of the mobile device when the user has not entered the search location data or the object name;
identify particular metadata that matches the search location data, the same location associated with object name, or the current location of the mobile device; and
present the at least one object associated with the particular metadata on the display.

19. The mobile device of claim 18, wherein, when writing the object and the metadata into the memory, the processor is configured to:
write the metadata and a pointer to the object into a database in the memory.

20. The mobile device of claim 18, wherein the processor is further configured to:
identify location metadata associated with a plurality of objects stored in the memory;
obtain a map spanning all locations corresponding to the identified location metadata; and
display, on the display, the map with markers corresponding to the identified location metadata.

* * * * *